United States Patent
Bush et al.

(10) Patent No.: US 8,588,351 B2
(45) Date of Patent: Nov. 19, 2013

(54) MULTI-BAND SIGNAL DETECTION

(75) Inventors: Kevin J. Bush, Northville, MI (US);
John R. Barr, Deer Park, IL (US);
Charles P. Binzel, Bristol, WI (US);
Ronald F. Buskey, Sleepy Hollow, IL
(US); Brian D. Storm, Round Lake, IL
(US)

(73) Assignee: Motorola Mobility LLC, Libertyville, IL (US)

(*) Notice: Subject to any disclaimer, the term of this patent is extended or adjusted under 35 U.S.C. 154(b) by 943 days.

(21) Appl. No.: 11/843,334

(22) Filed: Aug. 22, 2007

(65) Prior Publication Data
US 2009/0052500 A1    Feb. 26, 2009

(51) Int. Cl.
*H04B 7/10* (2006.01)
*H04L 1/02* (2006.01)

(52) U.S. Cl.
USPC ........... 375/347; 375/219; 375/221; 375/260; 375/285; 375/295; 370/339; 342/60

(58) Field of Classification Search
USPC ........ 342/52–58, 60; 375/219–221, 259–260, 375/130, 140, 146–148, 267, 271–285, 375/295–299, 302–307, 316, 322–351; 370/310, 328, 338–339
See application file for complete search history.

(56) References Cited

U.S. PATENT DOCUMENTS

| | | | |
|---|---|---|---|
| 5,258,981 A | 11/1993 | Davey et al. | |
| 7,756,487 B2* | 7/2010 | Lerner et al. | 455/76 |
| 8,411,766 B2* | 4/2013 | Wu et al. | 375/260 |
| 2002/0183008 A1* | 12/2002 | Menard et al. | 455/66 |
| 2004/0066334 A1* | 4/2004 | Fang et al. | 343/700 MS |
| 2004/0204031 A1* | 10/2004 | Kardach et al. | 455/552.1 |
| 2005/0089108 A1* | 4/2005 | Okada | 375/260 |
| 2006/0083205 A1* | 4/2006 | Buddhikot et al. | 370/338 |
| 2007/0058755 A1* | 3/2007 | Husted | 375/332 |
| 2007/0091998 A1* | 4/2007 | Woo et al. | 375/240.02 |
| 2007/0105587 A1* | 5/2007 | Lu | 455/552.1 |
| 2007/0281652 A1* | 12/2007 | Tanaka et al. | 455/260 |
| 2008/0045260 A1* | 2/2008 | Muharemovic et al. | 455/522 |
| 2008/0146269 A1* | 6/2008 | Pirzada et al. | 455/552.1 |
| 2009/0028115 A1* | 1/2009 | Hirsch | 370/337 |
| 2009/0316667 A1* | 12/2009 | Hirsch et al. | 370/338 |

* cited by examiner

*Primary Examiner* — Sam K Ahn
*Assistant Examiner* — James M Perez
(74) *Attorney, Agent, or Firm* — Gary J. Cunningham

(57) ABSTRACT

Apparatus may be provided including a spectrum analyzer and decision circuitry. The spectrum analyzer may be configured to ascertain wireless signal signature data from a wide range of frequency bands. The decision circuitry may be configured to modify operation of one or both of a receiver and a transmitter based on the signal signature data.

19 Claims, 3 Drawing Sheets

MULTI-BAND SIGNAL DETECTION

COPYRIGHT NOTICE

This patent document contains information subject to copyright protection. The copyright owner has no objection to the facsimile reproduction by anyone of the patent document or the patent, as it appears in the U.S. Patent and Trademark Office files or records, but otherwise reserves all copyright rights whatsoever.

FIELD OF THE DISCLOSURE

The present disclosure relates, in one or more aspects, to wireless devices that can accommodate different frequency bands and/or different wireless signal protocols (otherwise sometimes referred to herein as "modes").

BACKGROUND

Wireless devices (for example, mobile phones, one-way or duplex wireless communication units, appliances with wireless capabilities, computers, etc.) may be moved from one region to another, one environment to another, or one cell to another. As a device makes these changes, different receive or transmit carrier frequencies may become available to it, which may or may not require different communications protocols. When a wireless device is moved to a different region, environment, and/or cell, it may encounter problems. For example, it may be unable to determine the available receive or transmit carrier frequencies, or it may take too long to make such a determination.

SUMMARY

In accordance with one aspect of the present disclosure, apparatus are provided. The apparatus include a spectrum analyzer and decision circuitry. The spectrum analyzer is configured to ascertain, for respective different active carrier frequencies including at least four carrier frequencies in the 800 MHz to 2200 MHz range and at least two carrier frequencies in the 2.4 GHz to 5 GHz range, wireless signal signature data distinguishing communication protocols of such active carrier frequencies. The decision circuitry is configured to modify operation of one or both of a receiver and a transmitter, based on the signal signature data.

BRIEF DESCRIPTION OF THE DRAWINGS

Embodiments of the disclosure are further described in the detailed description which follows, by reference to the noted drawings, in which like reference numerals represents similar parts throughout the several views of the drawings, and wherein.

DETAILED DESCRIPTION

Figure 1:
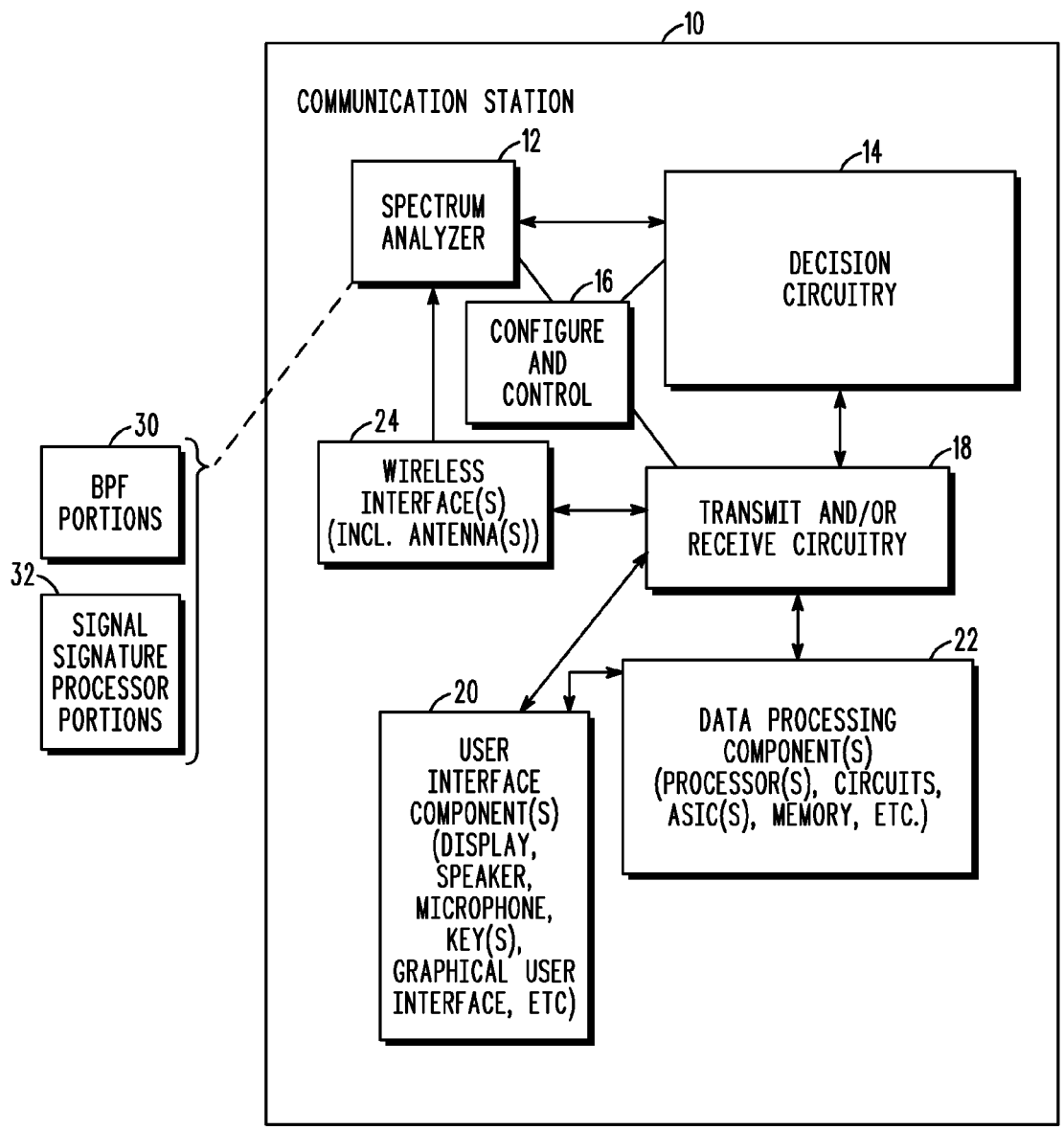
FIG. 1 is a block diagram of a communication station provided with a spectrum analyzer in accordance with one embodiment of the disclosure.

Various features and advantages of example embodiments are set forth in the description which follows. While specific embodiments and implementations are discussed, it should be understood that these specifics are for illustration purposes only. It should be recognized that other components and configurations may be used without departing from the spirit and scope as set forth, for example, in the claims.

Embodiments described herein may include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code or other data, including data structures, in the form of computer-executable instructions or data representations, or data structures. When information is transferred or provided over a network or another communications collection (either hard wired, wireless, or a combination thereof) to a computer, the computer properly views the connection as a computer-readable medium. Thus, any such connection is properly termed a computer-readable medium. Combinations of the above should also be included within the scope of computer-readable media or medium.

Computer-executable instructions include, for example, instructions and data which cause a general purpose computer, a special purpose computer, or a special purpose processing device to perform a certain function or group of functions. Computer-executable instructions also include program modules or other portions that are executed by computers in stand alone or network environments. Processing can be on one platform or distributed among plural platforms. Generally, program modules include routines, programs, objects, components, data structures, and so on, that perform tasks or implement abstract data types. Computer-executable instructions, data structures associated with such instructions, and program modules are examples of program code for executing steps or acts as disclosed herein. A particular sequence of executable instructions or associated data content, including data structures, represents examples of corresponding acts for implementing the functions described in such steps.

In certain embodiments of the present disclosure, apparatus, a method, or an electronic device may be provided. The present disclosure may also be directed to one or more portions of such apparatus, method, or electronic device, or a plural set of more than one such apparatus, method, or electronic device.

In accordance with one embodiment, apparatus are provided including a spectrum analyzer and decision circuitry. The spectrum analyzer is configured to produce wireless signal signature data across a range of frequency bands and signal types. The decision circuitry is configured to modify operation of one or both of a receiver and a transmitter based on the signal signature data.

In one embodiment of the disclosure, the spectrum analyzer is configured to ascertain such signal signature data for respective different active carrier frequencies including at least four carrier frequencies in the 800 MHz to 2200 MHz range and at least two carrier frequencies in the 2.4 GHz to 5 GHz range.

The apparatus may further include a wireless interface including front end circuitry and at least one antenna. The signal signature data produced by the spectrum analyzer may include signal metrics. In the alternative, or in addition, the signal signature data may include signal amplitudes within respective plural different frequency bands across certain ranges of frequency bands (e.g., those noted above), and band information concerning each of those bands. The band information may include the frequency location of each band. In addition, the band information may include information indicating the spectral breadth (for example, the width in hertz) of the band.

The spectrum analyzer may include a dynamically tuned resonator. The dynamically tuned resonator may be implemented in the form of a Kalman filter configured as a multi-mode resonator. The spectrum analyzer may also, or in the alternative, include a dedicated receive chain with a set of parallel bandpass filters.

The apparatus may include one of a receiver and a transmitter, or both a receiver and a transmitter (i.e., a transceiver). Accordingly the decision circuitry may be configured to modify operation of one or both of a receiver and a transmitter.

In modifying the operation of a receiver/transmitter, the decision circuitry is configured to choose a carrier frequency, or set of carrier frequencies, for receiving signals or for duplex communication. In addition, or in the alternative, the decision circuitry may be configured to choose a carrier frequency, or set of carrier frequencies, for transmitting signal(s) to one or more other devices separate from the apparatus.

FIG. 1 is a block diagram of a communication station 10 in accordance with one embodiment of this disclosure. The illustrated communication station 10 may comprise, for example, a mobile phone, a laptop computer, a personal digital assistant, an appliance, a computer, or any other type of communication device, apparatus, or system.

The illustrated communication station 10, in this one example embodiment, is a communication station that communicates via wireless media. Accordingly, it includes a wireless interface (or interfaces) 24. The wireless interface or interfaces 24 includes (include) one or more antennas (e.g., for diversity). The illustrated station 10 further includes a spectrum analyzer 12, decision circuitry 14, and transmit and/or receive circuitry 18.

A configure and control mechanism 16 may be provided for configuring and/or controlling each of spectrum analyzer 12, decision circuitry 14, and transmit and/or receive circuitry 18. By way of example, in accordance with one embodiment, configure and control mechanism 16 may include software that can be changed or updated on a periodic basis. This software could be updated so that communication station 10 can communicate over newly added frequency bands using new wireless communications protocols.

The illustrated communication station 10 further includes one or more data processing components 22, and one or more user interface components 20. The illustrated data processing component(s) 22 may, for example, include one or more processors, circuits, ASICs, and memories. The illustrated user interface component(s) may include, for example, a display, an audio speaker, a microphone, one or more keys (e.g., including a keyboard), and one or more graphical user interfaces.

The illustrated spectrum analyzer 12 is configured to produce wireless signal signature data from received signals received via wireless interface(s) 24. Accordingly, spectrum analyzer 12 includes bandpass filter (BFP) portions 30 and signal signature processor portions 32. The bandpass filter portions 30 separate, from the incoming wireless signal, signals corresponding to different portions of the frequency spectrum. Those separated portions of the incoming signal are then processed by signal signature processor portions 32 to produce the signal signature data, then used by decision circuitry 14 to effect modification of the operation of transmit and/or receive circuitry 18.

The signal signature data may include, for example, the frequency of a carrier that is available for receipt by the communication station 10, or for transmission by communication station 10. This frequency information could be determined, for example, by detecting overhead information from, for example, a beacon signal provided by a particular network, or by detecting data being transmitted by, or among, other communication stations over certain carrier bands. The signal signature data may include power information concerning one or more respective carrier bands, including, for example, the expected power range for a carrier band or a range of carrier bands for a particular signal type (or mode). For example, the mode may be an FM radio signal, in which case, the power of the transmitted signals is approximately 0.25, 1, 3, 5, 10, 25, 50, or 100 kW, depending on the class of service and the area coverage for the license that has been granted for that service.

The signal signature data may include data identifying and describing attributes of signals detected by the spectrum analyzer 12, or data indicating the availability of an unused and thus freely available carrier or channel (available for receipt and/or transmission by communication station 10), ascertained by spectrum analyzer 12, e.g., by reference to network notifications (e.g., beacon signals). Spectrum analyzer 12 may identify such signal signature data, for example, by detecting the presence of (one or more of) various information including but not limited to: signals transmitted over a given channel; a certain type of signal; a particular modulation type (for example, amplitude modulation, phase modulation, frequency modulation, pulse modulation, or any combination of select ones of these types of modulations); a given frame structure (for example, in the case of a TDMA signal); a signal requiring coherent detection or non-coherent detection; an analogue or digital signal; and, in the case of a digital signal, a specific type of digital communication (e.g., TDMA, FDMA, CDMA, or CSMA).

Other signal signature data, allowing decision circuitry 14 to determine the mode of signal, may, e.g., include indicating (one or more of) various information including indicating: whether the transmission is duplex, or one way (for example, in the case of television or AM or FM radio); whether a communication in a given band concerns a WLAN technology (e.g., more specifically, whether it is one or more of Bluetooth, UWB, ZigBee, WiFi, WiMAX, and so on); whether a channel that is available or detected concerns a cellular communications protocol (and if so, what specific protocol has been identified, for example, GSM, CDMA, etc); whether the communications protocol is a PCS protocol, cordless telephony (e.g., DECT), amateur radio, short-wave point-to-point communication, a wireless sensor network, and so on.

Figure 2:
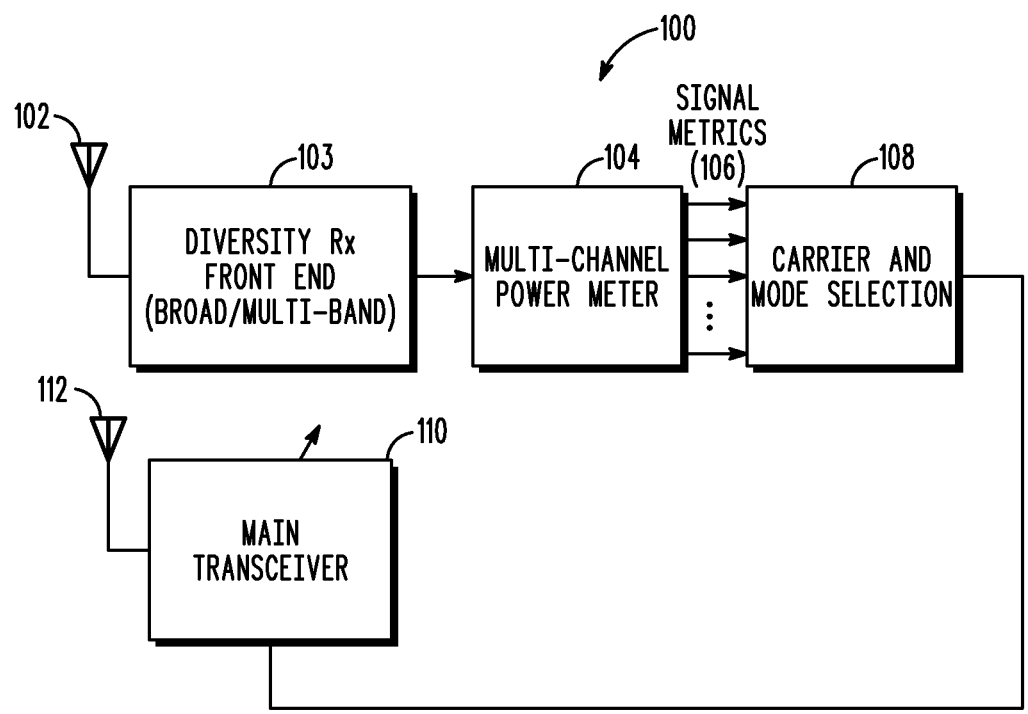
FIG. 2 is a schematic diagram of a communication station in accordance with another embodiment.

FIG. 2 is a block diagram of circuitry of a communication station 100 in accordance with another embodiment. The illustrated communication station 100 includes one or more antennas 102 for receiving signals for processing by a spectrum analyzer portion of the illustrated circuitry. In this embodiment, the spectrum analyzer portion includes a multi-channel power meter 104. The one or more antennas 102 is/are connected to a multi-channel power meter 104 via a diversity receive front end 103. The illustrated front end 103 is configured to receive signals across a wide range of frequencies.

Multi-channel power meter 104 receives the signals picked up via antenna(s) 102 and diversity receive front end 103, and outputs a set of signal metrics 106. Signal metrics 106 include, for example, power level values indicating the power level within respective frequency bands across a wide range of frequencies within the spectrum, or amplitude levels of signals received within such frequency bands. Those signal metrics 106 are input to a carrier and mode selection mechanism 108. The carrier and mode selection mechanism 108 is one embodiment of decision circuitry of the illustrated communication station 100. Carrier and mode selection mechanism 108 outputs a signal, forwarded to a main transceiver 110 of the illustrated communication station 100, to control the operation of main transceiver 110. Specifically, carrier and mode selection mechanism 108 receives the input signal metrics 106, and then, from that information, modifies the operation of main transceiver 110. Main transceiver 110 includes one or more antennas 112, for facilitating data transmission and/or reception by the illustrated communication station 100.

Figure 3:
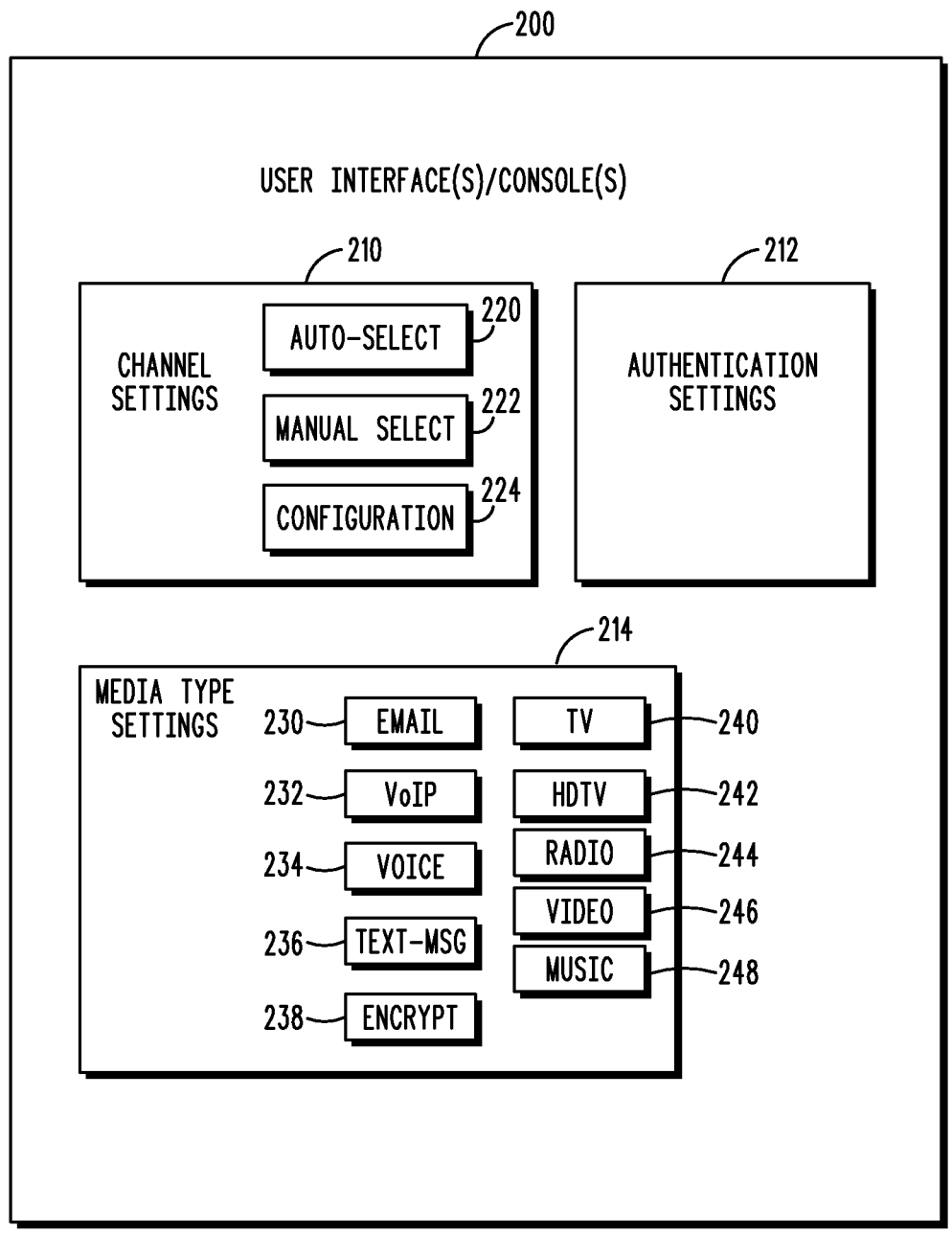
FIG. 3 is a schematic diagram of one or more user interfaces and/or one or more consoles of a given communications station.

FIG. 3 is a schematic diagram of one or more interfaces and/or consoles 200 that may be provided as part of, for example, communication station 10 or communication station 100, as described above. The (optional) illustrated user interface(s)/console(s) include a number of user interface components. The illustrated user interface components may each display information to a user, or receive such information from a user, or both display and receive certain information to and from a user interactively. Such information (displayed and/or received to/from a user) may include, for example, setting or control information, or status information concerning one or more functions of the communication station.

The illustrated user interface components illustrated in FIG. 3 include channel settings 210, authentication settings 212, and media type settings 214.

The illustrated channel settings 210 include user interface components for auto select 220, for manual selection 222, and for configuration of the channel settings 224.

The auto-select user interface components 220 facilitate the setting or control of the communication station, so that the communication station will automatically determine the channels over the wireless media to be used for transmission or reception of certain types of data. For example, the communication station may be configured to automatically choose, in accordance with a priority scheme, one set of channels for, for example, voice communications, and other channels for, for example, email communications.

Auto-select user interface components 220 may also be used by a user to configure automated functions of the decision circuitry. For example, it may be configured so that, when the signal signature data indicates that both cellular channels and WLAN channels are active and available, the operation of the communication station's transceiver will be modified to first attempt to use a cellular channel, and, after the attempt, if a suitable channel is not available in cellular range, WLAN channels will then be employed. When both cellular signal channels and WLAN signal channels are available, the priority scheme may select the strongest available cellular channels for voice communication, while it may select WLAN channels for email or text communications.

Manual selection user interface components 222 could be provided to allow a user to manually configure the communication station, for example, to identify a specific type of channel to be used for certain types of communications. Other configuration parameters may be input and/or viewed by a user via configuration user interface component 224.

Certain types of communications may require authentication of the communication station 10 or of a particular user using communication station 10, for example, by requiring the user to input a username and password combination (or other types of strong authentication). Authentication settings user interface components 212 may be provided, to allow authentication settings to be viewed by a user, and, for example, to allow a user to input a username and a password.

Media type settings user interface components 214 may be provided to allow a user to modify and/or view settings concerning the type of media communications that are available through the use of the communication station. Those settings may concern such types of media as email 230, voice over IP (VoIP) communications 232, and regular voice communications 234 (for example, in accordance with a particular connection-oriented protocol). In addition, other types of media communication types, for which media type user interface components may be provided (in this example embodiment), include text messaging 236, encryption 238, television 240, high definition television 242, radio 244, video 246, and music 248.

The claims, as originally presented, and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees, and others.

The invention claimed is:

1. Apparatus comprising:
a spectrum analyzer including a sweep along a frequency spectrum ranging from about 800 MHz to about 5.0 GHz, the spectrum analyzer being configured to ascertain wireless signal signature data, the wireless signal signature data being for respective different active carrier frequencies, the different active carrier frequencies including at least four carrier frequencies in the 800 MHz to 2200 MHz range and at least two carrier frequencies in the 2.4 GHz to 5.0 GHz range, and the wireless signal signature data includes distinguishing communication protocols of the active carrier frequencies; and
decision circuitry configured to modify operation of one of a receiver and a transmitter based on the wireless signal signature data,
wherein the spectrum analyzer includes a broad frequency Kalman scanner multi-mode resonator.

2. The apparatus according to claim 1, further comprising a wireless interface including front end circuitry and at least one antenna.

3. The apparatus according to claim 1, wherein the signal signature data includes wireless frequency band identifying information.

4. The apparatus according to claim 1, wherein the signal signature data includes signal metrics.

5. The apparatus according to claim 1, wherein the signal signature data includes signal amplitudes within respective plural different frequency bands and includes band information.

6. The apparatus according to claim 5, wherein the band information includes frequency location information.

7. The apparatus according to claim 6, wherein the band information further includes a spectral breadth of each of the plural different frequency bands for which the signal amplitudes are included.

8. The apparatus according to claim 1, wherein the spectrum analyzer includes a dynamically tuned resonator.

9. The apparatus according to claim 1, wherein the spectrum analyzer includes a dedicated receive chain including parallel bandpass filters.

10. The apparatus according to claim 1, wherein the decision circuitry is configured to modify the operation of one of a receiver and a transmitter by choosing a carrier frequency to receive data via a receiver at the apparatus.

11. The apparatus according to claim 1, wherein the decision circuitry is configured to, at certain times, modify the operation of one of a receiver and a transmitter by choosing a carrier frequency, and the decision circuitry is configured to, at other times, modify the operation of both a receiver and a transmitter by choosing a set of carrier frequencies for duplex communication.

12. The apparatus according to claim 1, wherein the decision circuitry is configured to modify the operation of one of a receiver and a transmitter by choosing a carrier frequency for transmission of data via the transmitter to another device separate from the apparatus.

13. A method comprising:
    employing a spectrum analyzer including a sweep along a frequency spectrum ranging from about 800 MHz to about 5.0 GHz, the spectrum analyzer being configured for ascertaining wireless signal signature data, the wireless signal signature data being for respective different active carrier frequencies, the different active carrier frequencies including at least four carrier frequencies in the 800 MHz to 2200 MHz range and at least two carrier frequencies in the 2.4 GHz to 5.0 GHz range, and the wireless signal signature data includes distinguishing communication protocols of the active carrier frequencies; and
    modifying operation of one of a receiver and a transmitter based on the wireless signal signature data,
    wherein the spectrum analyzer includes a broad frequency Kalman scanner multi-mode resonator.

14. The method according to claim 13, wherein the signal signature data includes wireless frequency band identifying information.

15. The method according to claim 13, wherein the signal signature data includes signal metrics.

16. The method according to claim 13, wherein the signal signature data includes signal amplitudes within respective plural different frequency bands and includes band information.

17. The apparatus according to claim 16, wherein the band information includes frequency location information.

18. The apparatus according to claim 17, wherein the band information further includes a spectral breadth of each of the plural different frequency bands for which the signal amplitudes are included.

19. An electronic device comprising:
    a spectrum analyzer including a sweep along a frequency spectrum ranging from about 800 MHz to about 5.0 GHz, the spectrum analyzer being configured to ascertain wireless signal signature data, the wireless signal signature data being for respective different active carrier frequencies, the different active carrier frequencies including at least four carrier frequencies in the 800 MHz to 2200 MHz range and at least two carrier frequencies in the 2.4 GHz to 5.0 GHz range, and the wireless signal signature data includes distinguishing communication protocols of the active carrier frequencies; and
    decision circuitry configured to modify operation of one of a receiver and a transmitter based on the wireless signal signature data,
    wherein the spectrum analyzer includes a broad frequency Kalman scanner multi-mode resonator.

\* \* \* \* \*